April 22, 1952 F. ALBRECHT ET AL 2,593,514
PLASTIC IDENTIFICATION SLEEVE FORMING MACHINE
Filed May 13, 1949 6 Sheets-Sheet 1
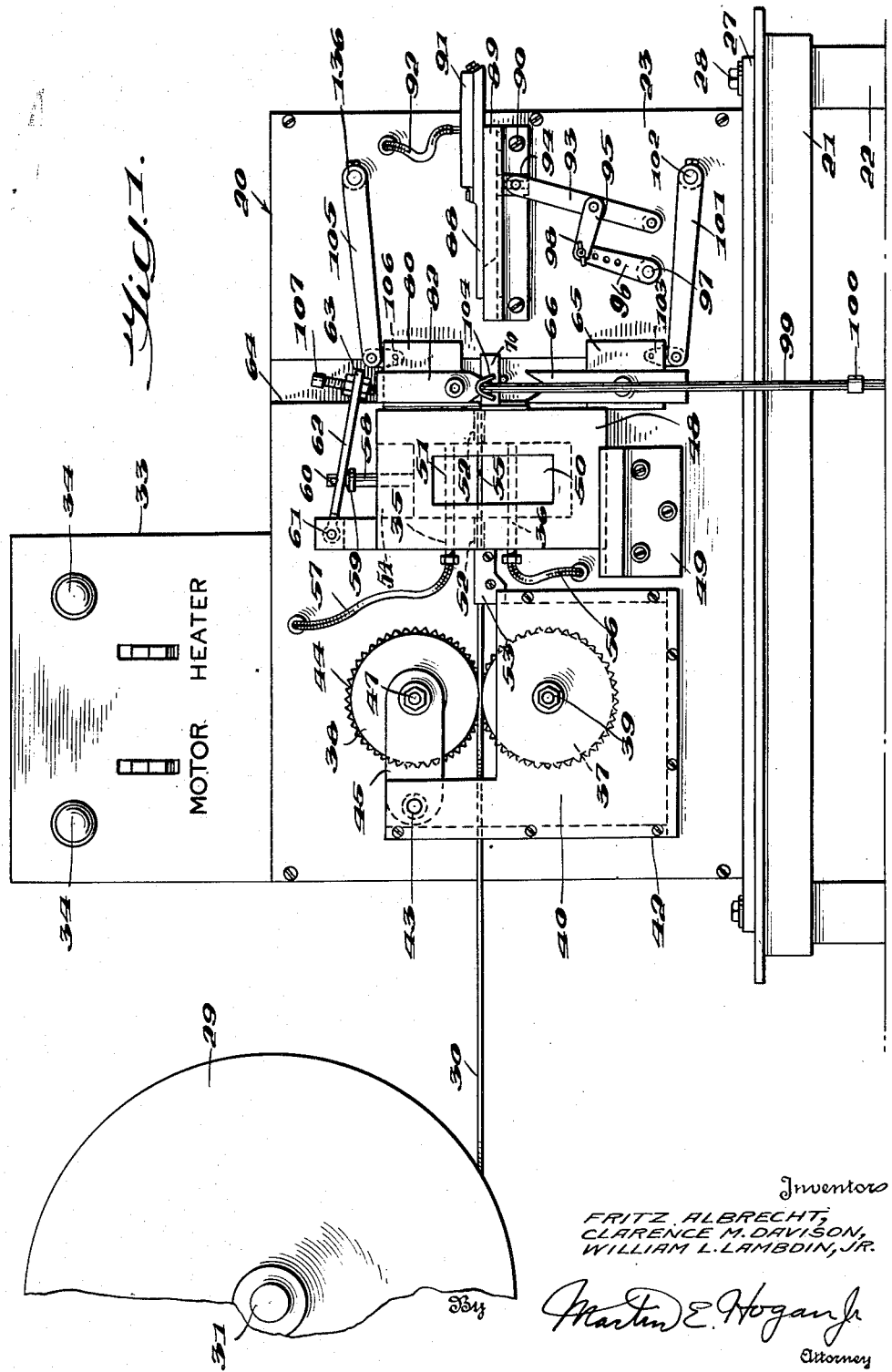
Inventors
FRITZ ALBRECHT,
CLARENCE M. DAVISON,
WILLIAM L. LAMBDIN, JR.
By Martin E. Hogan Jr.
Attorney April 22, 1952   F. ALBRECHT ET AL   2,593,514
PLASTIC IDENTIFICATION SLEEVE FORMING MACHINE
Filed May 13, 1949   6 Sheets-Sheet 2
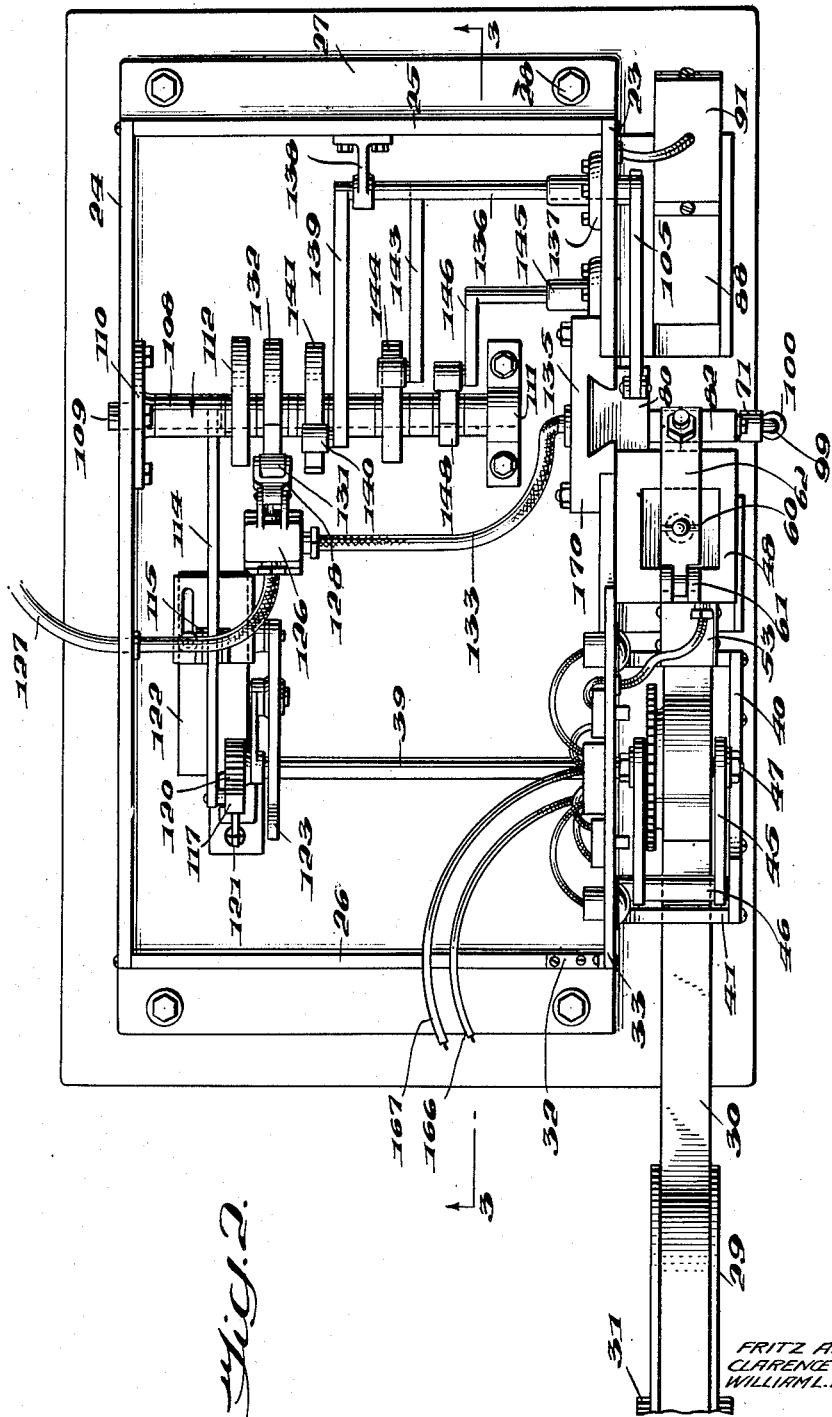
Inventors
FRITZ ALBRECHT,
CLARENCE M. DAVISON,
WILLIAM L. LAMBDIN, JR.
By Martin E. Hogan
Attorney April 22, 1952  F. ALBRECHT ET AL  2,593,514
PLASTIC IDENTIFICATION SLEEVE FORMING MACHINE
Filed May 13, 1949  6 Sheets-Sheet 3
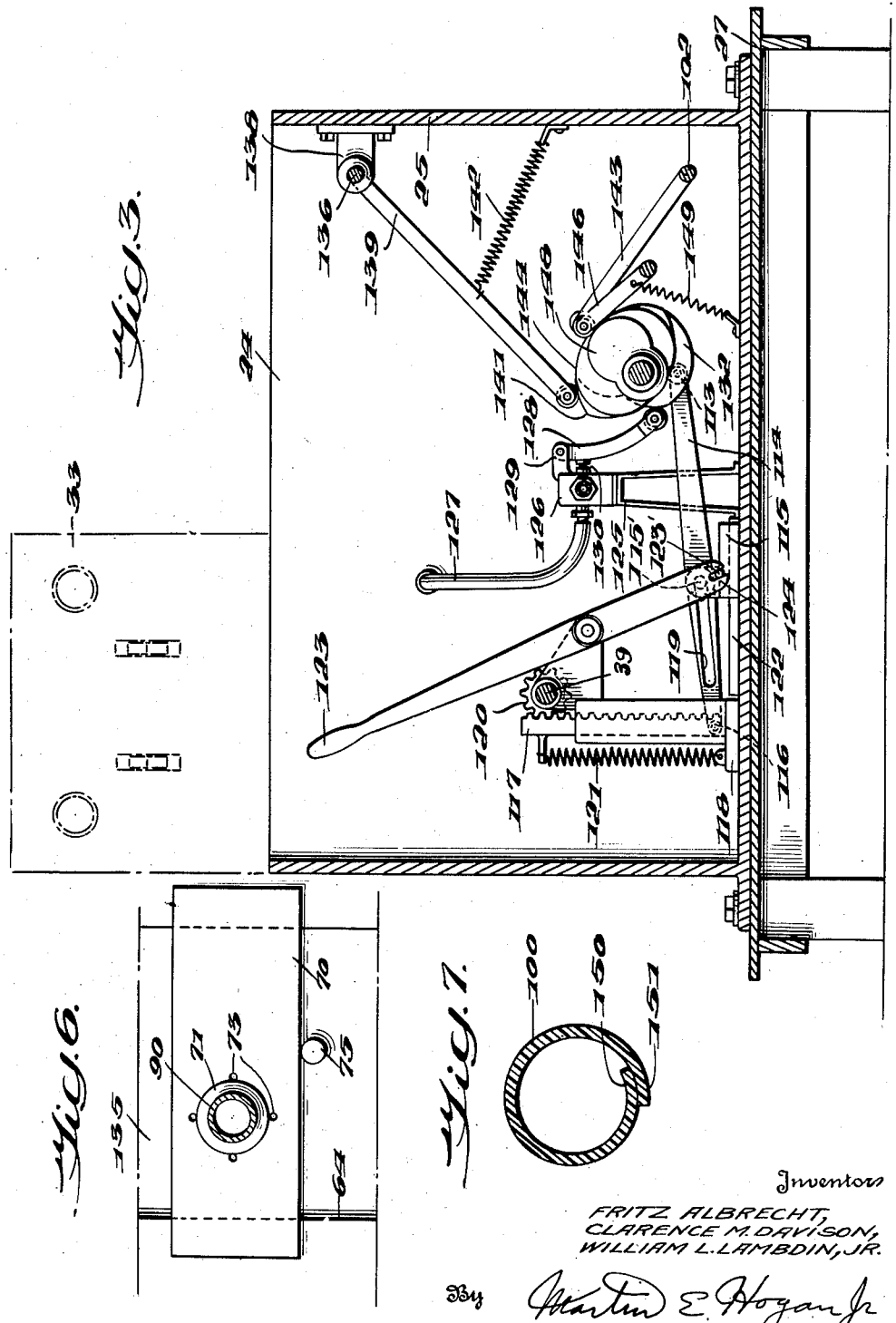
Inventors
FRITZ ALBRECHT,
CLARENCE M. DAVISON,
WILLIAM L. LAMBDIN, JR.
By Martin E. Hogan Jr.
Attorney April 22, 1952  F. ALBRECHT ET AL  2,593,514
PLASTIC IDENTIFICATION SLEEVE FORMING MACHINE
Filed May 13, 1949  6 Sheets-Sheet 4
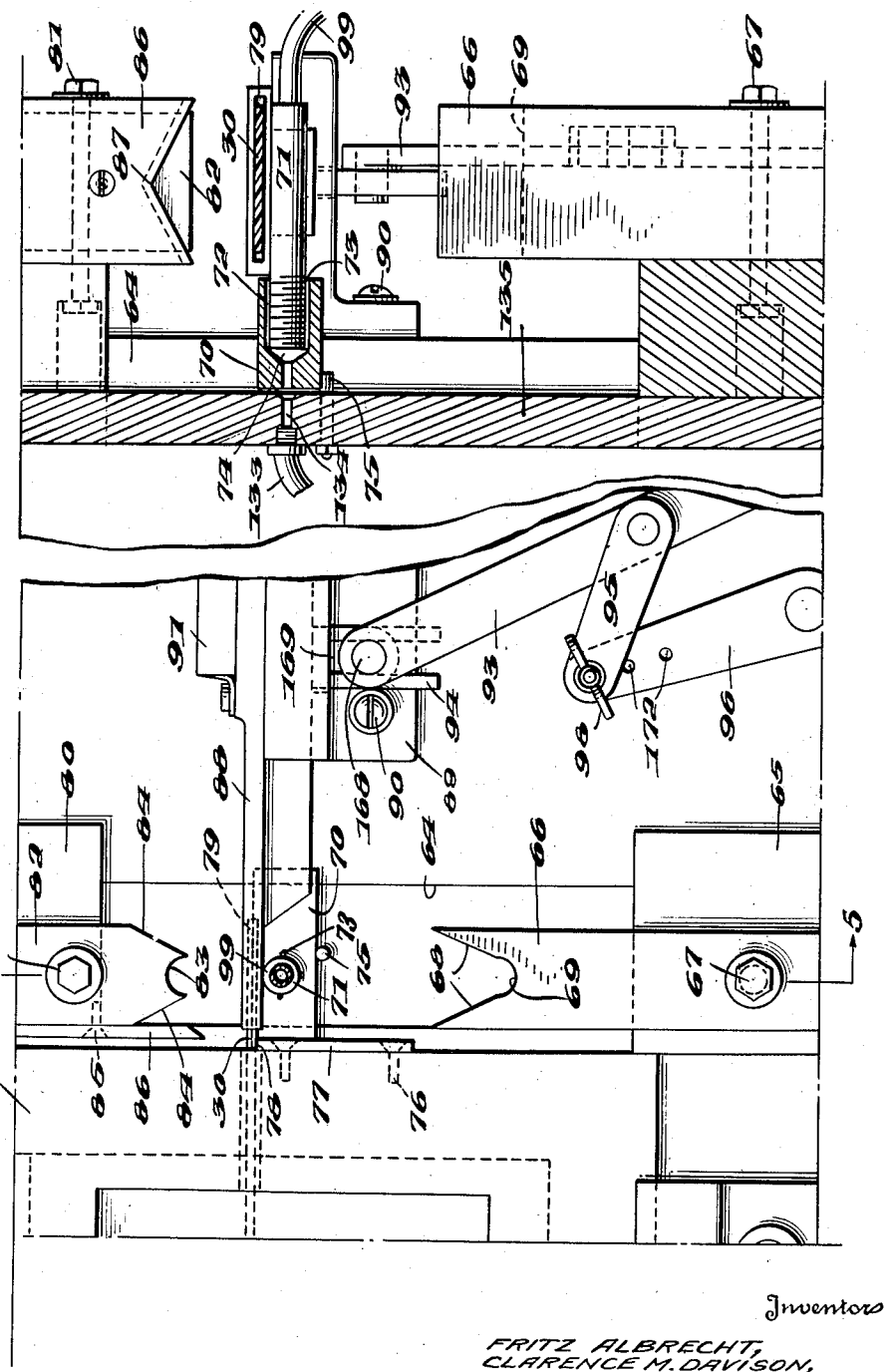
Inventors
FRITZ ALBRECHT,
CLARENCE M. DAVISON,
WILLIAM L. LAMBDIN, JR.
By Martin E. Hogan Jr.
Attorney

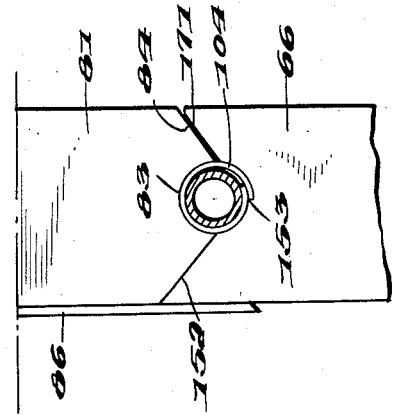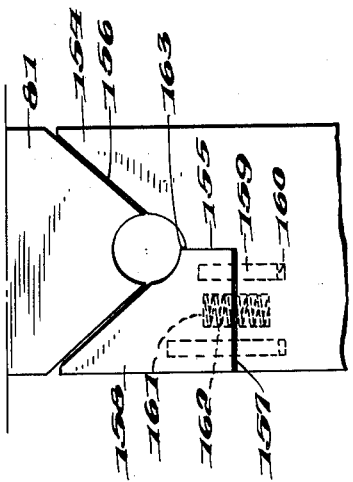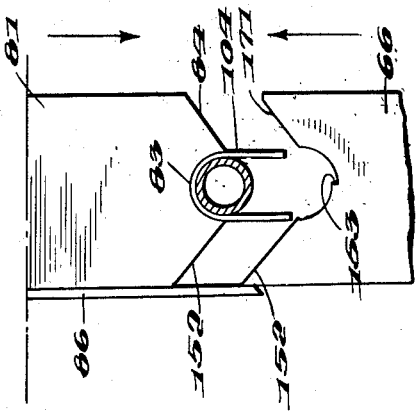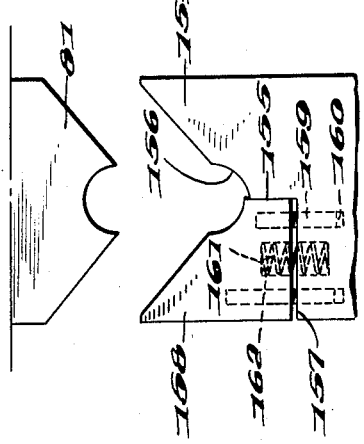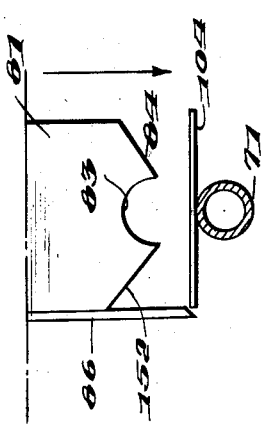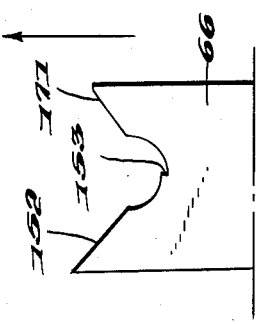

April 22, 1952　　　F. ALBRECHT ET AL　　　2,593,514
PLASTIC IDENTIFICATION SLEEVE FORMING MACHINE
Filed May 13, 1949　　　　　　　　　　　　6 Sheets-Sheet 6
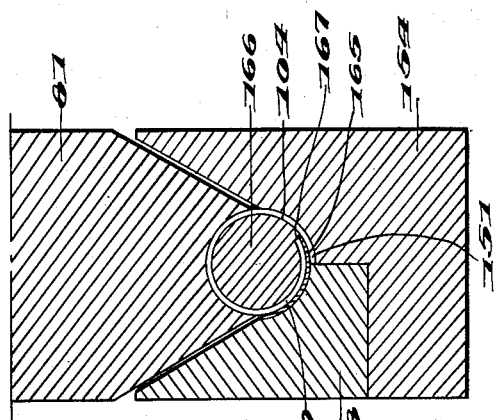
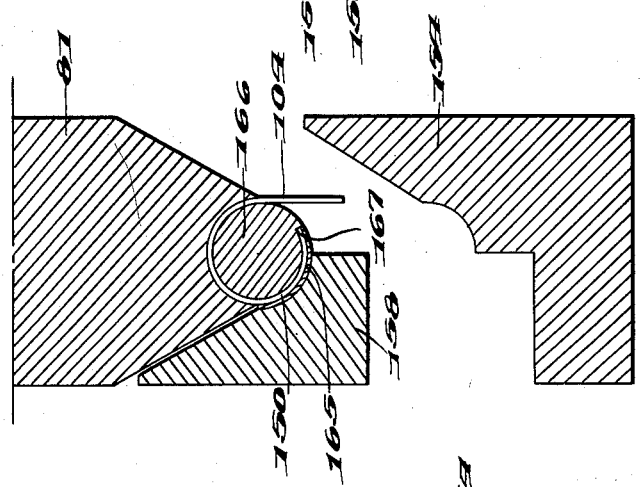
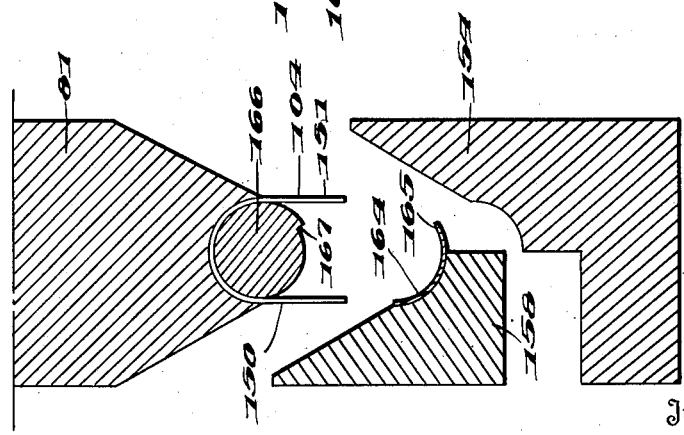
Inventors
FRITZ ALBRECHT,
CLARENCE M. DAVISON,
WILLIAM L. LAMBDIN, JR.
By Martin E. Hogan Jr.
Attorney Patented Apr. 22, 1952

2,593,514

UNITED STATES PATENT OFFICE 2,593,514

PLASTIC IDENTIFICATION SLEEVE FORMING MACHINE

Fritz Albrecht, Clarence M. Davison, and William L. Lambdin, Jr., Baltimore, Md., assignors to The Glenn L. Martin Company, Middle River, Md., a corporation of Maryland Application May 13, 1949, Serial No. 93,154

4 Claims. (Cl. 18—19)

Our invention relates to forming machines and more particularly to a machine for cutting and forming identification sleeves from a strip of thermoplastic material.

Heretofore, it has been difficult to maintain definite identification of various tubes and wires of complicated hydraulic and electrical systems, such as used in aircraft. In servicing such systems, it is highly desirable to be able to quickly identify the various parts with certainty. For example, the runs of tubing or plumbing common to an aircraft; i. e., gasoline lines, deicer fluid, hydraulic lines for operating landing gear, doors, and controls are oftentimes arranged in a common duct area. This close proximity of lines makes them difficult to trace and creates a serious service and repair problem if they cannot be speedily identified. For instance, in repairing a hydraulic line to a landing gear assembly operable at oil pressures that exceed 1,000 pounds p. s. i., care must be exercised to valve-off the right section of tubing to be repaired in order to avoid serious disruption of the entire hydraulic system. Likewise, gasoline lines must be readily identifiable for special treatment before being serviced.

Heretofore, especially in military aircraft, it has been customary practice to mark all tubing with some form of pressure adhesive tape attached thereto as a means of identification. A marking of this type has been found to have a limited life and to be highly susceptible to accidental detachment during normal servicing and cleaning operations.

The present invention comprises a machine having heating units through which a flat strip of thermoplastic material is passed, with cutting blades and forming dies positioned to cut and form the heated plastic material into sleeves or bands adapted to be snapped on and bonded around a tubular member. An identifying sleeve so made can be easily installed on a section of tubing or a bundle of wires which is incapable of removal short of destruction.

It is, therefore, one of the principal objects of the present invention to provide an improved machine for making identification sleeves from plastic strip material.

Another object is to provide a machine for forming a sleeve suitable for encircling a tubular member with the ends of the sleeve suitably positioned for adhesive joining.

A further object is to provide a machine capable of making an identification sleeve adapted for snapped-on engagement around a tubular article.

A still further object is to provide a machine capable of forming plastic sleeves to a variety of sizes.

Another object is to provide a machine for forming a plastic sleeve under heat and pressure with overlapped ends held out of engagement with each other.

Other objects of this invention will become apparent from the following description when taken in conjunction with the accompanying drawings, in which like numbers refer to like parts in different views.

In the drawings:

Figure 1 is a front elevation view of the plastic sleeve forming machine of this invention.

Figure 2 is a plan view of the machine.

Figure 3 is a front sectional view on line 3—3 of Figure 2 including the control panel in phantom.

Figure 4 is an enlarged fragmentary view of the cutter, dies, mandrel and strip guiding plate in operation positions.

Figure 5 is a section view on line 5—5 of Figure 4 showing details of the mandrel assembly.

Figure 6 is an enlarged front view of the mandrel assembly showing details of the air passages positioned to conduct air outwardly of the mandrel base.

Figure 7 is a sectional view of a plastic sleeve formed by the machine of this invention.

Figure 8 is a fragmentary schematic view of a modified set of dies in which the dies are formed with an offset portion and arranged to position an end of the sleeve against an abutment formed in the lower die.

Figure 9 is a fragmentary schematic view of the same set of dies illustrated by Figure 8 with the sleeve half formed.

Figure 10 is a fragmentary schematic view of the same set of dies illustrated by Figure 8 in their final position with the sleeve fully formed.

Figure 11 is a fragmentary schematic view of a modified set of dies in which the bottom die is formed in two parts separated by spring means.

Figure 12 shows the dies of Figure 11 in closed position.

Figure 13 is a schematic fragmentary section of a modified form of dies formed with cooperating offsets including a sleeve end separator.

Figure 14 shows the dies of Figure 13 in half-closed position.

Figure 15 shows the dies of Figure 13 in closed position.

Referring more particularly to Figure 1, the identification sleeve forming machine 20 of the present invention is illustrated as positioned on a flat horizontal bed or table 21 supported in an elevated position by a plurality of legs 22. The machine 20 includes a rectangular box-like structure having vertical front 23 and rear 24 plates (see Figure 2), right 25 and left 26 walls mounted on a base plate 27 secured to the table by suitable bolts 28. Supported separately from the machine is a supply reel 29 carried by a suitable mount 31 from which the plastic sleeve material or strip 30 is supplied to the forming machine.

Rigidly fixed at its lower side to the front plate 23 by suitable brackets 32 is an upstanding control panel 33 on which are mounted suitable motor and heater control switches in circuit with a suitable electrical supply circuit. Suitably arranged on the control panel are also conventional indicating lights 34 in circuit respectively with a top heater 35 and bottom heater 36 positioned for heating the plastic strip as hereinafter described. The lights 34 are arranged in the heater circuits for cooperative operation with thermostats (not shown) carried by each heater to indicate when the heaters 35 and 36 are sufficiently heated to receive the material to be formed into sleeves.

The strip 30 of material to be formed by the machine 20 into individual identification sleeves consists of a relatively long section of thermoplastic material of suitable width and thickness for forming under heat and pressure into a number of sleeves corresponding in length to the width of said strip and of a predetermined diameter.

Such a strip material as that disclosed by Yergen Von Stackelberg et al. in patent application for Plastic Identification Sleeve, bearing Serial Number 71,782, filed January 21, 1949, has been found to give satisfactory results. This material is formed from cellulose acetate butyrate extruded to a thickness of substantially .025 of an inch and approximately one inch in width. Other materials such as the products of the copolymerization of vinyl acetate and vinyl chloride have been found to be satisfactory. The thermoplastic characteristic of these materials is taken advantage of by the machine of this invention to hot form sleeves generally circular in configuration from the flat strip 30 for snapped-on application to a circular article.

Advancement of the strip 30 off the supply reel 29 at a predetermined speed is accomplished by a pair of feeding rollers 37 and 38 mounted exteriorly of the front plate 23. Rollers 37 and 38 are of sufficient diameter and provided with a non-slip peripheral surface of sufficient width for tractive engagement with the strip 30 inserted therebetween to advance said strip as along a strip path extending from the supply reel to the former on rotation of the rollers. Both rollers are formed with an extended rim having match teeth 44 adapted for geared engagement with each other. The bottom roller 37 acts as the drive roller and is drivingly mounted on the shaft 39 through a conventional overrunning clutch assembly (not shown) adapted to impart clockwise rotation to said bottom roller on oscillatory rotation of said shaft. Support for the end of the shaft 39 exteriorly of roller 37 is provided by a face plate 40 spaced outwardly of the frontplate 23 by suitable plate spacers 41 (see Figure 2) fitted around securing screws 42. Face plate 40 also provides part of the means for supporting the top roller 38. Top roller 38 is mounted directly over the drive or bottom roller 37 on a stub shaft 47 carried by a pair of spaced arms 45 pivotally mounted on a pivot pin 43 positioned outwardly of the front plate 23 with one end supported by the face piece 40. Separation of the arms 45 adjacent each side of the roller 38 is provided by a collar 46 inserted over the pivot pin 43. The cooperative arrangement of the pivoted arms 45, the stub shaft 47 and the teeth 44 is used to attain uniform driven rotation of the top roller 38 by the bottom roller 37 irrespective of changes in the thickness of the strip 30 as the top roller is allowed to ride by its own weight on the strip of sleeve material placed therebetween. The weight of the top roller 38 is normally sufficient to hold the strip 30 firmly in engagement with both rollers so as to effect forward movement thereof free of slippage as both rollers are rotated in opposite directions on driven rotation of the bottom roller 37; however, in the working of extremely thin or extremely smooth strip material, it may be found desirable to draw the top roller more tightly against the strip by a spring means added to the arm 45 assembly. Positioned to the right of the rollers 37 and 38 and centered relative to strip 30, is a heater carrier 48 slidably supported by a bracket 49 bolted to the front plate 23. The channel-like arrangement of the top of bracket 49 is such as to allow for movement of the carrier 48 toward and away from the rollers 37 and 38. Such movement of the carrier 48 provides for adjustment of the machine 20 to effect the forming of sleeve sections of different lengths as required to form sleeves of different diameters. The heater carrier 48 is formed as a cage-like structure having a cavity 54 therein adapted to receive and position a pair of separable heating blocks 50 and 51 above and below a strip slot 52 area, forming part of the strip path extending therethrough with the said heating blocks being left sufficiently exposed as to permit access to the ends and sides thereof. The strip slot 52 is dimensioned to receive and channel the strip 30 through the carrier between blocks 50 and 51 formed in the carrier 48 on advancement of the strip by rollers 37 and 38. Positioned between the carrier 48 and the rollers, is a removable hooded extension 53 of the strip slot 52 adapted to enclose and support the strip 30 as it is moved along the path and before it enters the carrier so as to guard against any tendency it may have to buckle on its advancement by the rollers. The possibility of the strip buckling is greatest when the carrier is adjusted to the right, away from the rollers, as is done when small sleeves are being formed and we have found that the extension 53 provides for uniform feeding of different stock materials formed to different sleeve sizes.

The bottom heater block 50 is formed of sufficient height to bottom within the cavity 54 with its top surface 55 in the same plane as and forming a continuation of the bottom of slot 52 of the carrier 48. Heating of the block 50 to a suitable temperature is provided by an electric heating unit 36 inserted therein and connected to the electrical supply circuit through the control panel 33 by a flexible cable 56 extending therebetween.

The top heater block 51 is arranged for up and down sliding movement within the cavity 54 of the cage-like carrier 48 to allow for lifting of the block from off the strip after it has been sufficiently heated and ready for further advancement. Heating of the top heater block 51 is accomplished by a second heating unit 35, of any conventional type, suitable for insertion through the slotted end of the carrier 48 and into the heater block arranged as a movable structure and is likewise connected to the electrical supply line through the control panel 33 by a flexible conductor 57 connecting with the heater switch.

Extending upwardly from and connected to the top heater block 51 is a rod 58 having a free end exposed above the carrier 48. Rod 58 is provided with a pair of abutments comprised of a shoulder 59 formed around the rod and a cross piece 60 inserted through the rod. In engagement with rod 58 and adapted for upward lifting movement is a lift bar 62, having one end fulcrumed on an upright extension 61 of the carrier 48 and loosely engaged to rod 58 by being apertured to pass between the shoulder 59 and crosspiece 60 with its opposite, or free, end 63 extended to the right of and beyond the carrier 48. Lift bar 62, being extended over the heater cavity 54 with one end pivoted on upright extension 61 and the other end 63 arranged free with an intermediate point connected to rod 58, is positioned to lift the heater block 51 on upward movement of said free end of the bar.

Spaced to the right and inwardly of the heater carrier assembly is a dove-tailed groove 64 extending upwardly of the front plate 23 and normal to the strip slot 52 from a point below the strip path to the top of the front plate. The arrangement of the dove-tailed groove 64 provides a top entrant channel transversely positioned adjacent the strip path. The groove 64 or channel can be either formed in the front plate 23 or as a separate groove block 170 attached thereto as shown in Figure 2. Positioned for up and down movement parallel to the groove 64 is a lower die block 65 having a back portion formed with a tongue matched to fit in the dove-tail of the groove to provide for guided movement therein. Carried by the lower die block 65 is a lower die 66 secured to said block by suitable bolt means 67 (Figure 4) and formed with side forming surfaces 68 and a curved bottom forming surface 69.

Positioned opposite the sleeve slot 52 is an intermediate or mandrel block 70 also formed with a back portion as a tongue matched to the dovetailed groove 64 and adapted for slidable mounting in said groove. Carried by and protruding outwardly of the intermediate or mandrel block 70 is a mandrel 71. The mandrel 71 is cylindrical in form and of sufficient diameter to provide a circular forming surface of substantially the same diameter as the article to be encompassed by the formed identification sleeve produced by the machine 20. Mandrel 71 as shown by Figure 5 is adapted for screw mounting in a threaded aperture 72 formed in the block 70. Around aperture 72 are a plurality of air holes or channels 73 extending outwardly from a point adjacent the inner end of the mandrel. These air holes or channels 73 communicate with a funnellike air passage 74 formed at the base of aperture 72 which opens to the rear or back surface of the mandrel block 70. The function of the air channels 73 is to conduct a plurality of air streams from an air supply source under pressure outwardly along the mandrel 71 to cool and remove from the mandrel a hot sleeve formed thereon. Although we have shown the mandrel 71 as screw-mounted in its carrier block 70, certain sizes have been found to give satisfactory service when inserted with a press fit, and also, it is to be understood that the mandrel may be formed integrally with the carrier block.

The mandrel assembly is held from dropping too low in the slide groove 64 by a stop means consisting of a projecting pin 75 positioned to provide an abutment within the dove-tailed groove 64. The location of pin 75 relative to the strip slot 52 is such as to position the mandrel 71 just below the slot (see Figure 4) so that the strip, or sleeve, material 30 advanced through the slot is extended directly over the mandrel.

Removably attached to the heater carrier 48 by screws 76 is a bottom cutter 77 having a cutting edge 78 spaced adjacent to the strip slot 52 and positioned so that the sleeve strip 30 passes thereover on advancement out of the slot. The function of the cutting edge 78 is to provide a straight cutting edge across the strip path for a cutter adapted to cut the strip 30 on its advancement out of the strip slot 52 into the desired lengths for forming into sleeves.

Slidably mounted in the dove-tailed groove 64 for up and down movement relative to the mandrel block 70 is a third, or upper die carrier, block 80 (Figures 1, 2, and 4). Attached to the face of the upper block 80 by suitable bolt means 81 is an upper die 82 formed with a semi-circular mandrel matching portion 83 and upwardly sloped sides 84. The angle of the sloped sides 84 of the upper die 82 is matched to that of the forming surfaces 68 of the bottom or lower die 66 to allow for matched engagement therewith with the mandrel 71 entirely encompassed, but spaced therefrom to a predetermined sleeve thickness, when the dies are brought together in forming position.

Attached to the side of the upper die 82 adjacent the heater carrier 48 by suitable screw means 85, is an upper cutting blade 86 adapted for sliding engagement past the cutting edge 78 of the bottom cutter 77, carried by the heater carrier, on downward movement of the upper die. The cutting blade 86 is formed with a V-shaped cutting surface 87 adapted to first engage the outer edges of the hot strip 30 material advanced from the strip slot 52 so as to cut uniformly from both sides of the strip toward the middle on progressive downward movement of the blade. In this manner of cutting, any tendency of the hot strip material to misalign while being cut is eliminated and the parallel cutting of the sleeve section ends is assured so that they will align properly on forming of the section into a sleeve.

On advancement of the strip 30 from between the heating units 50 and 51 in a heated condition for forming, it is relatively limp, and the free end has a tendency to bend downwardly and curl back. Therefore, in order to properly position the strip 30 over the mandrel 71 for forming, we provide a strip guide 88, as best shown in Figure 4, formed from a strip of metal of greater width and thickness than the strip material to be shaped having a recess or cavity 79 formed inwardly of one end and adapted to receive the strip to guide it across the mandrel 71. The guide 88 is mounted for sliding movement, in alignment with the strip slot 52, on a side bracket channel member 89 extending outwardly of front plate 23 and secured thereto by suitable fastening means 90. Premature cooling of the strip 30 material contacted by the guide 88 is avoided by providing the guide with a suitable heating means 91 electrically connected to the heater circuit by a flexible cord 92 (Figure 1). Reciprocal movement of the guide 88 to guide the strip 30 over the mandrel 71 is effected by a pivoted arm 93 mounted below the guide and connected thereto by a depending slotted ear 94 formed integrally with the guide. Push and pull force is conveyed to the pivoted arm 93 through a link 95 connected to a second arm 96 mounted adjacent the first arm on a shaft 97 extending inwardly of the front plate 23 for activation by an eccentric hereinafter described. Adjustment of the amount of movement conveyed to the guide 88 for forming different size sleeves is provided for by an adjustable bolt and wing nut 98 assembly adapted for insertion through apertures 172 formed in the second arm 96 for connection of the connecting link 95 to the pivoted arm 93.

Inserted in the drilled end of the mandrel 71 is a tube 99, or rod, that extends below the machine table 21 for conducting a formed sleeve 100 to a suitable sleeve container. The conveying tube 99 is formed with an outside diameter less than the inside diameter of the sleeve 100 and is positioned to extend from inside the end of the mandrel as a continuation thereof to keep the formed sleeves from being blown away by the air blast directed outwardly of the mandrel. It is, of course, apparent that this means of conducting the formed sleeves can be readily used with a bin storage system designed for handling a plurality of sleeve sizes.

Upward movement of the top heater 51 from gravitational engagement with strip 30 to release said strip for advancement after it has been heated and is ready for forming, is accomplished on raising of the upper die 82 into engagement with the adjustable post 107 carried by the free end of the heater lift bar 62. The adjustable post 107 is not restricted to any given point of contact with the die 82 in order to allow for operation with different sized dies used in the forming of different sized sleeves.

The upper die block 80 is first actuated to allow the cutting blade 86 to drop with a guillotine-like action past the lower cutter edge 78 to cut a section 104 from the heated strip 30 of sufficient length to encircle the mandrel 71. Further downward movement of block 80 brings the upper die 82 into engagement with strip section 104 to form the section over the top of the mandrel as best shown in Figure 1 on the downward movement of the upper arm 105. Connection of arm 105 to the upper die block 80 is provided by a top pivotal link 106 carried by the block.

Upward movement of the lower die 66 into engagement with the upper die 82 to form a sleeve 100 around the mandrel 71 is attained on movement of the lower die actuator arm 101 drivingly mounted on the end of the lower die actuator shaft 102 connected to the die block 65 by a pivoted link 103. Oscillatory movement of the actuator shaft 102 is accomplished by an eccentric means mounted inwardly of the front plate 23 as hereinafter described in detail and shown by Figures 2 and 3.

In Figure 2 is shown the arrangement of the driving mechanism of the machine in which a drive shaft 108 is adapted for rotation by an electric motor having a suitable speed reduction means (not shown) connected to the drive end 109 of the drive shaft extended exteriorly of the rear plate 24. The drive shaft 108 is journalled for rotation in suitable bearings such as a back bearing 110 carried by the back plate 24 and an end bearing 111 carried by the base 27. The drive shaft is formed with a plurality of eccentrics arranged to effect the intermittent operation of the various members of the machine in proper sequence as required to advance, heat, cut, form, and finally remove the finished product as hereinafter explained.

Inwardly of the back plate 24, or wall, is the roller 37 actuating eccentric 112 fixed on the drive shaft 108 for rotation therewith. Below the roller eccentric 112 is a cam follower 113 (see Figure 3) carried on the end of a pivoted roller arm 114 pivoted at 115' on a horizontally adjustable pivot support 115. The bifurcated opposite end 116 of the pivoted arm 114 is movably connected for lifting movement to a rack 117 held in an upright position by a stanchion 118 fixed to the base 27 and formed with a slotted front and an open top. The rack 117 is positioned for cooperative engagement with a pinion 120 drivingly carried by the roller driving shaft 39. As previously set forth the roller shaft 39 is effective to rotate roller 37 in only a forward, or clockwise, direction. Return of the rack 117 and the arm 114 to their down positions on rotation of the eccentric 112 to a non-eccentric position is effected by a spring 121 extending between the rack and stanchion 118.

The movable pivot support 115 is mounted on a base 122 fixed to the machine base 27 with the top of said pivot base providing a rail-like surface along which the movable pivot support is adapted for movement. Movement longitudinally of the pivoted arm 114 varies the amount of lift effected thereby and, consequently, the extent to which the rollers 37 and 38 are rotated is attained by the adjustment thereof. Convenient adjustment of the pivot support 115 is provided by an adjusting lever 123 having a bifurcated end 124 in engagement with pin 123' on the pivot support 115. Lever 123 is shown pivotally carried by the stanchion 118; however, in certain instances where the machine is to be enclosed, we have found it desirable to mount the lever on one of the machine side walls with a portion of the lever exposed outwardly of the machine. It is to be noted that shortening of the lever movement effected by the pivoted arm 114 is attained by movement of the pivot 115' along slot 119 formed in the pivoted arm 114 toward the rack 117. And although we have shown the pivot support 115 moved to a position of maximum lever movement for the purpose of illustration, it is to be understood that in the forming of the smaller sized sleeves as shown in Figure 1 that the pivot would be positioned farther to the left than as indicated in Figure 3.

Mounted on a pedestal 125 adjacent the drive shaft 108 is a conventional type of air valve unit 126 adapted for actuation to release a predetermined quantity of air under pressure from a suitable air line supplied through a duct 127 extending through the back plate 24. Extending from the valve unit 126 is a valve arm 128 having a secured end 129 pivoted beyond a valve stem 130 and provided at its free end with a roller contactor 131 positioned for engagement with the valve eccentric 132 carried by the drive shaft 108. As the eccentric 132 rotates against the air valve roller contactor 131, on rotation of the drive shaft 108, the valve arm 128 is moved back against the valve stem 130. Pressure on valve stem 130 releases a blast of air under pressure through a connecting duct 133 in nippled communication with an air hole 134 (Figure 5) formed in the die groove back wall 135 adjacent the mandrel 71. Air entering air hole 134 in turn is directed through the air passage 74 formed at the base of mandrel 71 and thence outwardly through air channels 73 formed around the mandrel. Air under pressure so conducted is of such volume and so directed as to penetrate between the mandrel surface and a plastic sleeve 100 formed therearound to cool and remove the formed sleeve.

Intermittent up and down movement of the upper die block 80 is effected through an upper die actuating shaft 136 to which the upper die arm 105 is fixed for movement therewith. The upper die shaft 136 extends through the front plate 23 and is supported by suitable bearing members 137 and 138 carried by the front plate 23 and side wall 25 respectively. The interior end of the upper die shaft 136 is provided with an extended crank 139 placed normal thereto having an upper die roller 140 carried at its end and positioned for engagement with the upper die eccentric 141 carried for rotation by the drive shaft 108. Rotation of eccentric 141 by the shaft 108 effects rising and falling movement of the crank 139 adapted to convey similar action to the upper die arm 105 since the two are fixed at opposite ends of shaft 136. Return of the crank to a down position is not only gravitational but also under the urge of a crank spring 142 (Figure 3) positioned to extend between the crank and the supporting right wall 25.

Coordinated up and down movement of the lower die block 65 by its actuator arm 101 is accomplished by a similar drive arrangement wherein the actuator arm's shaft 102 (Figure 1) extends interiorly of the front plate 23 and has mounted thereon a lower die crank 143 positioned for engagement with a lower die actuating eccentric 144 carried by the drive shaft 108. The weight of the lower die assembly is normally sufficient to hold the actuator crank 143 in engagement with the eccentric 144; however, in case a lighter assembly is used it is obvious that a spring means associated with the actuator crank to urge it into continuous contact with the lower die eccentric would be advisable. The degree of eccentricity and radial positioning of both the upper die eccentric 141 and the lower die eccentric 144 as well as the arm linkages are arranged so that the lower die 66 is not raised into engagement with the sleeve section 104 being formed until the upper die 82 has been dropped around the sleeve section positioned over the mandrel 71 as best illustrated in Figure 1.

Reciprocal movement of the strip guide 88 to lead the end of strip 30 across the mandrel 71 is accomplished by means of a guide shaft 97 extended interiorly of the machine front plate 23 and mounted in an extended bearing 145 (Figure 2) carried by the front plate 23 with the interior end of the shaft formed as a guide crank 146. The free end of the guide crank 146 is extended adjacent the drive shaft 108 for engagement with a guide eccentric 148 carried by said shaft. The crank 146 is moved to the downwardly position under the urge of a guide crank spring 149 secured to the machine base 27. The movement of the guide plate 88 is synchronous with advancement of strip 30 by rollers 37 and 38 after the strip has been heated for forming in the heater assembly so that the heated strip is supported and guided over the mandrel 71. The guide bar actuating linkage is designed and arranged to provide for sufficient movement of the guide bar 88 so that it is withdrawn from around the end of the strip 30 before the strip is fully cut off to form section 104 as shown in Figure 1. In this manner any misplacement of the section 104 to be formed is avoided. Likewise, the upward movement of the top heater block 51 must be synchronized with rotation of the drive rollers 37 and 38 to release the strip 30 after heating for advancement across the forming mandrel 71 to a predetermined point to allow for it to drop over the mandrel.

In Figure 7 is illustrated in cross-section, an identification sleeve 100 formed generally circular, with an inner end 150 and an outer end 151 overlapped over each other, from the strip 30 material by being first heated, cut to the desired size and formed under pressure around the mandrel 71 of machine 20. The amount of overlap between ends 150 and 151 or its entire elimination in a sleeve formed with butted ends is determined by the length to which the sleeve section 104 is cut for forming. Length of the sleeve section 104 is controlled by the amount of strip 30 material advanced by the rollers 37 and 38 for each cut as well as the distance provided between the cutting edge 86 and the forming portion of the die. In case an end butted sleeve is desired the extent to which the strip advancing rollers are rotated is reduced from that required for an overlapped sleeve of like diameter. On the other hand, in case a greater than normal overlap is desired, the dies may be moved farther away from the cutting edge.

Figures 8, 9, and 10 illustrate three different positions in the progressive movement of dies having a fixed abutment or offset 153 positioned in the bottom die 66 to recline and hold the one end of the cut strip 104 against undesired movement in those instances where it is desirable to hold the sleeve overlap to close tolerances. It is to be noted that the slope area 171 of the right die is reduced in length relative to the upper slope area 84 to allow for a greater circumference in the overlapped side of the sleeve 104 as shown in Figure 10. The left slope areas 152 are arranged for matched engagement on full closure of the dies. In Figure 8, the dies are shown fully separated; the section 104 has just been cut from a strip of material and is in engagement with only a slight portion of the mandrel 71. In Figure 9, the upper die 81 has been lowered to engage section 104 of the strip material with said section formed around the top of the mandrel 71 and the ends of the section about ready to enter the lower die 66. Figure 10 shows the dies in closed position with the section 104 of the material in formed condition as an overlapped sleeve.

In Figures 11 and 12 are shown a modified form of lower die in open and closed positions respectively wherein the bottom die is formed in two parts. One part is formed as a base 154 having a vertical surface 155 extending downwardly of a semi-circular forming area 156 and a horizontal flat surface arranged as a ledge 157 disposed from the vertical on which the second part 158 rests in the full forming position shown in Figure 12. The two parts are connected by suitable guide pins 159 inserted into matched pin holes 160 formed in both parts. Separation of the second part to raise it above the ledge 157 is accomplished by a compression spring 162 placed therebetween with ends socketed in matched sockets 161 formed in both parts. In this manner a movable abutment 163 of variable height is provided against which the outer end of the sleeve is positioned as the dies are moved toward each other.

Figures 13, 14, and 15 show in cross-section a further modification of the die assembly wherein the second part 158 of a bottom die is formed with an insert 164 having an extended portion 165 adapted to extend over a portion of the lower die 154 in spaced relationship thereto so as to separate the sleeve ends 150 and 151 from each other during the forming operation. In this modification a center former 166, generally circular in shape is provided with a step 167 extending lengthwise thereof and arranged as an abutment for the inner end 150 of the sleeve 104 to hold said end against slippage as the material is wrapped around the former. This arrangement of the dies provides a means of eliminating the tendency that certain plastics have to stick together when formed under heat and pressure.

Operation of the machine is as follows:

The desired quantity of suitable sleeve material formed as a strip 30 is wound on the supply reel 29 and the free end of the strip inserted between rollers 37 and 38. The strip is then advanced along the strip path through guard 53 and slot 52 between the heating blocks 50 and 51 on rotation of the rollers 37 and 38. With the strip 30 advanced between the heating blocks 50 and 51, the top heating block 51 is allowed to rest directly on the strip with the lift bar 62 in a down position during the time required for the roller eccentric 112 to rotate through its noneccentric position relative to the pivoted arm 114 and the top die carrier 80 is allowed to remain in down position. In this manner, non-advancement of the strip is synchronized with the heating and forming operation. It is, of course, understood that heating units 35 and 36 will have been energized by being placed in circuit with a suitable electric supply system connected to the panel board 33 by feeder 166. In forming the strip 30, composed of cellulose acetate butyrate, we have found that an operating temperature of approximately 220° F. at the heaters is sufficient to condition the strip for hot forming. The driving motor assembled with a suitable speed reduction unit (not shown) is adapted for energization from a suitable supply circuit through the motor switch of panel 33 connected thereto by the motor cable 167 and when so energized, rotates the driving shaft 108. Rotation of the drive shaft 108 places into synchronized operation all of the eccentrics affixed thereto with their associated mechanisms. First to be actuated is the upper block 80 which is raised to allow advancement of strip 30 from between the heating blocks through slot 52. The drive roller 37 mechanism is then actuated through the eccentric through 112 to raise rack 117 which in turn rotates shaft 39 to rotate the drive roller as well as roller 38 geared thereto by meshed gears 44 which advances the strip 30 a predetermined distance as predetermined by the adjustment of the pivot 115. Simultaneously, with the advancement of the strip 30 out of slot 52 the guide 88 will have been placed adjacent the strip slot 52 to receive the end of the strip 30 inserted into the recess 79 for carrying it to the right and over the mandrel 71 on clockwise rotation of the shaft 97 through movement of the crank 146, in engagement with the guide eccentric 148. Movement of the guide shaft 97 is conveyed to the guide 88 through the arm 96 connected to the guide arm 93 by link 95. After the strip 30 has been advanced the proper distance for forming, the top cutting edge 86 is brought into cutting engagement with the strip on downward movement of the upper die 82 carried by the upper block 80 under the urge of spring 142 on rotation of the upper die eccentric 141 to a lesser degree of eccentricity. The upper die is then lowered against the cut section 104 of the strip 30 to form said section around the forming mandrel 71 positioned adjacent slot 52 slightly below the strip path. Subsequent to the downward movement of the upper die, the lower die 66 is moved upwardly by the lower die actuating arm 101 on rotation of shaft 102 formed with a crank end 143 placed in engagement with the lower forming die eccentric 144 rotated by the driving shaft 108. The lower die 66 being formed with opposed inwardly sloping surfaces 68 directs the ends of the strip section 104 inwardly to encircle the forming mandrel 71 as the rounded bottom die surface 69 is brought into final forming position against the sleeve ends to form the strip generally cylindrical. The length of the strip section 104 is predetermined to position the ends in overlapped or butted relationship depending on the type of sleeve engagement desired.

The forming pressure developed between the upper and lower dies is sufficient to form the strip section 104 to the form of a sleeve as shown in Figure 7. The dies are then disengaged by reverse action of their operating mechanisms on further rotation of the eccentrics leaving the sleeve 100 in its formed condition on the mandrel 71. The air control valve eccentric 132 is positioned relative to the die eccentrics to engage the air control valve arm 128 to allow passage of air through the air valve unit 126 to blow off the sleeve 100 on opening of the dies at the end of the forming cycle. The valve 126 directs a blast of air into the air duct 133 and thence through air hole 134 (Figure 5) formed in the wall 135 adjacent the mandrel 71 which, in turn, is placed in communication with passage 74 into which air holes 73 open and in turn lead outwardly of the mandrel base so as to direct the blast of air outwardly of the mandrel against and under the formed sleeve 100 in encircled position around the mandrel. The function of the air blast developed by the action of the valve unit 126 is not only to cool the formed sleeve and fix it in shape, but also to separate it from the mandrel and blow it therefrom as a finished product. The movement of the formed sleeve 100 blown off the mandrel is controlled by a sleeve guide means consisting of a tube or rod 99 inserted within the apertured end of the mandrel 71 and bent downwardly into a suitable sleeve receiver, such as a box or the like.

The adjustable mounting of the heater carrier 48 on bracket 49, as well as the quick removability of the upper and lower dies, provides for the production of various sized sleeves to fit different sized tubes or circular articles. The production of sleeves for standard code markings of an aircraft as previously described covers a range of tube sizes of from ¼" to 2" which are also suitable for use in marking various tubes and cables common to other mechanisms.

Although our invention has been shown and described in considerable detail, it will be appreciated that certain changes, alterations, modifications, and substitutions can be made without departing from the spirit and scope of the claims.

We claim as our invention:

1. In a sleeve forming machine having a strip path and means for moving a strip of material along said path, a support wall spaced from said path, a heater assembly carried by said support wall having heating elements positioned adjacent said path, one of said elements being movable away from the strip path, a channel extending vertically of the support wall, a mandrel carried by the channel and spaced from the heater assembly to extend transversely of the strip path for positioning of the strip material thereon, an upper die adapted for parallel movement relative to the channel having a forming surface for engagement with the strip to form said strip over the mandrel, a cutter associated with said upper die adapted to cut the strip into a sleeve section having parallel ends, a lower die adapted for parallel movement relative to the channel having a forming surface for engagement of the strip to form said strip under the mandrel as a sleeve.

2. In a machine for forming plastic sleeves from sections of strip material formed with parallel ends, a stationary mandrel, upper and lower cooperating dies adapted for movement toward the mandrel, one of said dies having a substantially semi-circular forming surface, the other of said dies comprising two relatively movable parts having generally arcuate forming surfaces facing in the general direction of said mandrel, one said arcuate forming surface being closer to said mandrel than said other arcuate forming surface in all positions of relative movement of said parts whereby to form an abutment of variable height, said abutment extending generally parallel to said mandrel for engagement with one end of the section to position said end in overlapped relation to the other end of said section on being formed as a sleeve between said dies and the mandrel.

3. In a machine for forming plastic sleeves from sections of strip material having parallel ends adapted for overlapped engagement, a former having a mandrel and movable dies for forming said section of strip, one of said dies being formed as a split die with at least two forming surfaces, one of said forming surfaces being movably positioned closer to the mandrel relative to the other with the juncture between the two being formed as an abutment for holding one end of said strip on the forming thereof between said mandrel and said dies, and means carried by said split die for urging one of said forming surfaces into a position of maximum abutment height.

4. In a machine for forming a sleeve having overlapped ends from a section of plastic material, a former having a mandrel, and dies movable to encompass the mandrel, said dies being formed with at least three relatively movable forming surfaces for forming a sleeve having spaced ends around said mandrel, a separating means formed as an extension of the forming surface of one of said dies and positioned to overlap a portion of the forming surface of an adjacent die, said extension being in varying spaced relation to the forming surface of said adjacent die to receive and separate one end of the sleeve from the other end thereof.

FRITZ ALBRECHT.
CLARENCE M. DAVISON.
WILLIAM L. LAMBDIN, JR.

REFERENCES CITED

The following references are of record in the file of this patent:

UNITED STATES PATENTS

| Number | Name | Date |
|---|---|---|
| 141,433 | Gately et al. | Aug. 5, 1873 |
| 179,295 | Gilbert | June 27, 1876 |
| 483,957 | Godfrey | Oct. 4, 1892 |
| 489,399 | Treat et al. | Jan. 3, 1893 |
| 1,078,707 | Tevander | Nov. 18, 1913 |
| 1,181,964 | Bohlman | May 2, 1916 |
| 1,234,330 | Gray | July 24, 1917 |
| 1,628,257 | Mallory | May 10, 1927 |
| 1,793,089 | Heyes | Feb. 17, 1931 |
| 2,046,047 | Watkins | June 30, 1936 |
| 2,229,613 | Strauch | Jan. 21, 1941 |
| 2,279,505 | Ravenscroft | Apr. 14, 1942 |
| 2,358,932 | Knight | Sept. 26, 1944 |
| 2,447,499 | Erk | Aug. 24, 1948 |
| 2,480,378 | Myers | Aug. 30, 1949 |
| 2,521,387 | Maynard et al. | Sept. 5, 1950 |

FOREIGN PATENTS

| Number | Country | Date |
|---|---|---|
| 636,662 | Germany | Oct. 15, 1936 |